UNITED STATES PATENT OFFICE.

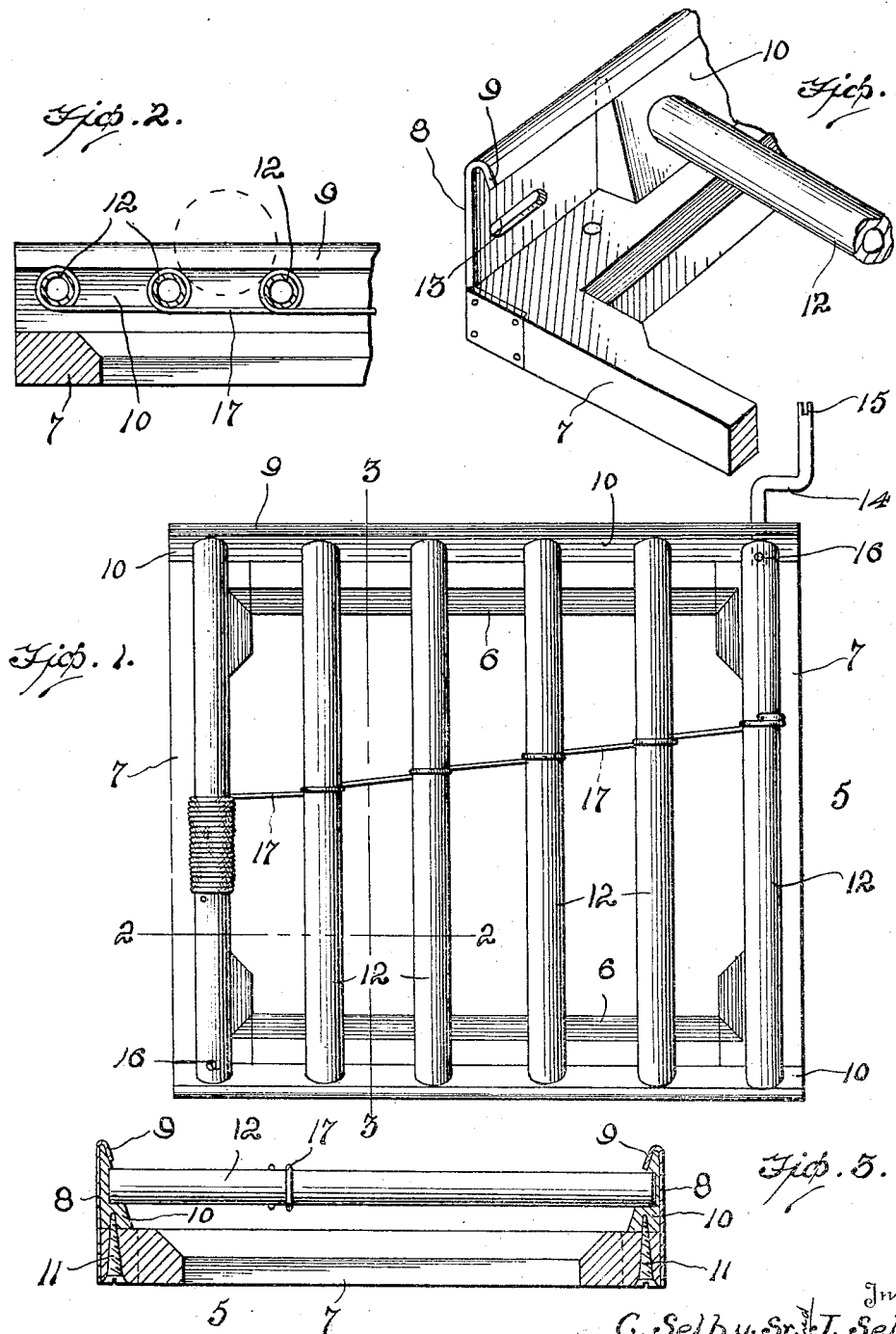

CHESTER SELBY, SR., AND JAMES SELBY, JR., OF MONTREAL, MISSOURI.

ROLLER-SHELF FOR INCUBATORS.

1,235,066. Specification of Letters Patent. Patented July 31, 1917.

Application filed February 16, 1915, Serial No. 8,517. Renewed June 21, 1917. Serial No. 176,252.

*To all whom it may concern:*

Be it known that we, CHESTER SELBY, Sr., and JAMES SELBY, Jr., citizens of the United States, residing at Montreal, in the county of Camden and State of Missouri, have invented certain new and useful Improvements in Roller-Shelves for Incubators; and we do hereby declare the following to be a full, clear, and exact description of the invention, such as will enable others skilled in the art to which it appertains to make and use the same.

This invention relates to roller shelves, especially designed for use in connection with incubators.

The invention has for its object to provide a roller shelf of novel and efficient construction including a frame and a pair of removable and interchangeable strips mounted therein and supporting a plurality of rollers.

Another object is the provision of a roller shelf for incubators including a plurality of egg supporting rollers designed to be simultaneously rotated to turn the eggs supported thereon.

Another object is the provision of novel means for rotating the rollers and transmitting rotary motion from one to the other of the rollers.

With these and other objects in view, the invention consists of the novel construction, arrangement and formation of parts as will be hereinafter specifically described, claimed and illustrated in the accompanying drawing, in which:

Figure 1 represents a top plan view of the roller shelf.

Fig. 2 represents a fragmental longitudinal sectional view on the line 2—2 of Fig. 1.

Fig. 3 represents a longitudinal sectional view on the line 3—3 of Fig. 1.

Fig. 4 represents a fragmental perspective view of one of the corners of the shelf.

Referring to the drawing in detail, wherein similar reference numerals designate corresponding parts throughout the several views, the numeral 5 indicates generally the frame of the roller shelf, which is preferably rectangular in formation and includes pairs of side and end members 6 and 7 respectively. A pair of guide plates 8 are secured to the outer longitudinal edges of the side or longitudinal members 6 of the frame and the upper longitudinal edges 9 thereof are turned inwardly and downwardly, as clearly illustrated in Fig. 4.

Strips or blocks 10 substantially triangular in cross section are slidably mounted upon the top surfaces of the side members 6 and the relatively small upper edges thereof are engaged between the plate 8 and the downwardly and inwardly directed flange or edge 9 thereof to secure the blocks against lateral movement within the frame 5. The blocks 10 are secured in adjusted position in the frame by removable screws 11, or equivalent means.

A plurality of equidistant apertures are formed transversely through the blocks 10 and rotatably receive a plurality of egg-supporting rollers 12, preferably of hollow tubular formation and constructed of a light, durable metal.

Longitudinally elongated openings 13 are formed in the opposite ends of the opposed side plates 8 and are adapted to register with the longitudinal openings through the end rollers 12, for the reception of either end of an operating crank 14, having slotted ends 15 adapted to receive pins 16 secured diametrically through the end rollers 12 adjacent their opposite ends.

A cord or other flexible element 17 secured at one end to one of the end rollers 12, is coiled a number of times about said roller and is coiled once about the central portion of each of the rollers intermediate the end rollers, the opposite extremity of the flexible element being secured to the other end roller 12. When the operating crank 14 is inserted within and engaged with the pin 16 of either of the end rollers or tubes 12 and is rotated to wind the flexible element 17 on the roller said flexible element is unwound from the roller at the opposite end of the frame, thus rotating the last mentioned roller together with each of the intermediate rollers over which the flexible element travels.

In use, the roller shelf is suitably supported within the incubator (not shown) and the eggs to be hatched are placed in rows upon the supporting rollers 12, as illustrated in dotted lines in Fig. 2. When it is desired to turn the eggs the crank 14 is inserted in the end of one of the end rollers 12 and is rotated to wind the flexible element 17 thereon, thus rotating each of the other rollers 12 and imparting rotational movement to the eggs supported thereon. When the chicks hatch, they drop between the rollers 12 and through the rectangular frame 5 into the incubator nursery, while the shells are supported upon the rollers. It is clearly evident that all of the eggs disposed within the holder are simultaneously turned without any jar or handling thereof.

In order that eggs of various sizes may be supported within the holder, blocks having openings various distances apart are provided for rotatably supporting the rollers 12 in proper spaced relation. It is clearly evident that the blocks and rollers 12 mounted therein may be quickly and conveniently removed from and replaced within the frame 5 by simply removing the screws 11.

What I claim is:

A roller shelf for incubators comprising a frame, a pair of side plates secured to the side members of said frame and having the upper edges directed inwardly and downwardly, a pair of blocks mounted upon said side members and under the curved edges of said side plates, means securing the blocks in place and adapted to be removed to permit the blocks to be withdrawn longitudinally from said frame, and rollers mounted in said blocks.

In testimony whereof we affix our signatures in presence of two witnesses.

CHESTER SELBY, Sr.
JAMES SELBY, Jr.

Witnesses:
RALPH REED,
C. E. FOWLER.

Copies of this patent may be obtained for five cents each, by addressing the "Commissioner of Patents, Washington, D. C."